US006347084B1

United States Patent
Hulyalkar et al.

(10) Patent No.: US 6,347,084 B1
(45) Date of Patent: Feb. 12, 2002

(54) METHOD OF TIMESTAMP SYNCHRONIZATION OF A RESERVATION-BASED TDMA PROTOCOL

(75) Inventors: Samir N. Hulyalkar, Bensalem, PA (US); Elik Shekhter, Bronx; Leon Steiner, Yorktown Heights, both of NY (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/086,270

(22) Filed: May 28, 1998

(51) Int. Cl.[7] .................................................. H04J 3/06
(52) U.S. Cl. ....................... 370/347; 370/350; 370/503
(58) Field of Search ................................. 370/395, 503, 370/507, 508, 509, 516, 350, 321, 324, 347, 348

(56) References Cited

U.S. PATENT DOCUMENTS

| 5,602,992 A | | 2/1997 | Danneels ............... 395/200.19 |
| 5,966,387 A | * | 10/1999 | Cloutier ...................... 370/516 |
| 6,026,074 A | * | 2/2000 | Stadler et al. ............... 370/230 |
| 6,115,422 A | * | 9/2000 | Anderson et al. ........... 375/240 |
| 6,157,646 A | * | 12/2000 | Nichols ....................... 370/395 |
| 6,167,048 A | * | 12/2000 | Law et al. ................... 370/395 |
| 6,243,369 B1 | * | 6/2001 | Grimwood et al. ......... 370/335 |

* cited by examiner

Primary Examiner—Min Jung
(74) Attorney, Agent, or Firm—Daniel J. Piotrowski (57) ABSTRACT

A method for synchronizing timestamps in a network (e.g., a wireless ATM network) that includes a control node and a plurality of other nodes that communicate with one another over a common channel mediated by a medium-access control subsystem (e.g., one that uses a reservation-based TDMA protocol). The method includes the steps of sending a first command from the control node, at a first time, then storing a starting timestamp value in a register within the control node and each of the other nodes, in response to the first command, and then sending a second command from the control node, at a second time later than the first time. Each of the other nodes computes the difference between the starting timestamp value and a current timestamp value, and then adds the computed difference to the current timestamp value. In an alternative embodiment, the control node sends a preset command and each of the other nodes presets their respective timestamp to a prescribed initial timestamp value, in response to the preset command. Each of the nodes periodically compares a current timestamp counter value with a prescribed reset value, and upon detecting a coincidence, sets a sync flag latch to indicate that a next timestamp value correction is to be made, in response to a next preset command. Networks that implement the above-described methods are also disclosed.

26 Claims, 4 Drawing Sheets

METHOD OF TIMESTAMP SYNCHRONIZATION OF A RESERVATION-BASED TDMA PROTOCOL

BACKGROUND OF THE INVENTION

The present invention relates generally to systems and methods that enable multiple-access of the same channel in a network, and, more particularly, to a system and method of timestamp synchronization in a network that employs a reservation-based TDMA protocol.

In general, communications networks, particularly wireless networks, typically employ a multiple-access protocol that is designed to prevent collisions of data packets due to simultaneous transmission of the data packets by multiple transmitters in the network using the same channel. One protocol that has come into widespread use is known as Time-Division Multiple Access (TDMA). A detailed description of this technique can be found in the reference book *Telecommunications Networks: Protocols, Modeling and Analysis*, Addison-Wesley, 1997. In general, in accordance with the TDMA protocol, channel time is divided into small time slots, each of which is assigned to a different node (user). This time slot assignment can either be fixed (classical TDMA), or variable (reservation-based TDMA). In either case, since the number of nodes (users) is finite the data is usually transmitted in TDMA "frames", which ensure that the delays encountered by the different users are finite.

For example, in fixed-assignment TDMA, the TDMA frame consists of the total number of slots assigned to all users, after which the TDMA frame repeats. In the case of reservation-based TDMA, a natural framing occurs in terms of different "phases" of the TDMA frame, consisting typically of a "control" phase in which reservations are requested and assigned, and a "data" phase in which the data is transmitted by the different users in their respective assigned time slots.

It is necessary that all transmitters and receivers in the TDMA network be synchronized in terms of the TDMA frame. An incorrectly synchronized transceiver, at best, cannot communicate, but, at worst, can cause the entire TDMA network to collapse if appropriate safeguards are not built into the protocol. It should be recognized that TDMA frame synchronization is not the same as clock synchronization of a modem, which is a function of the Physical layer. Usually, frame synchronization is achieved using a centralized control strategy implemented by a central controller (CC). However, frame synchronization can also be implemented in a distributed fashion.

In most TDMA networks, a universal time reference is required to properly allocate resources for transmission. This universal time reference is usually provided in the form of a "timestamp", e.g., which specifies the current time, such as 2 p.m. The timestamps are broadcast periodically by the central controller, and are used by the end terminals (ETs) to synchronize their "timestamp" registers.

For variable-sized TDMA frames, synchronization achieved through the use of timestamps typically requires the utilization of a phase-locked loop (PLL) in each of the ETs, which can be quite complex. Further, the PLLs used for this purpose must be redesigned whenever the parameters of the timestamp scheme are changed, for example, when the frequency of timestamp transmission is changed. In this connection, a generic synchronization scheme is desired in order to enable an ET to be used interchangeably within many different networks.

With presently known frame synchronization techniques, the timestamp values are generated from a common clock. For example, in accordance with the IEEE 1394 standard, the clock distribution within a local 1394 serial bus is accomplished by means of the cycle master (or the central controller) periodically sending a cycle_start packet, which contains the current bus_time (or timestamp). This "resynchronization" is ideally performed every 125 ms. However, it is possible that the transmission of the cycle_start packet could be slightly delayed due to the local 1394 serial bus being used by another node when the cycle_start packet needs to be sent, thereby requiring the cycle master to wait until that node finishes its transmission before sending the cycle_start packet.

Figure 1:
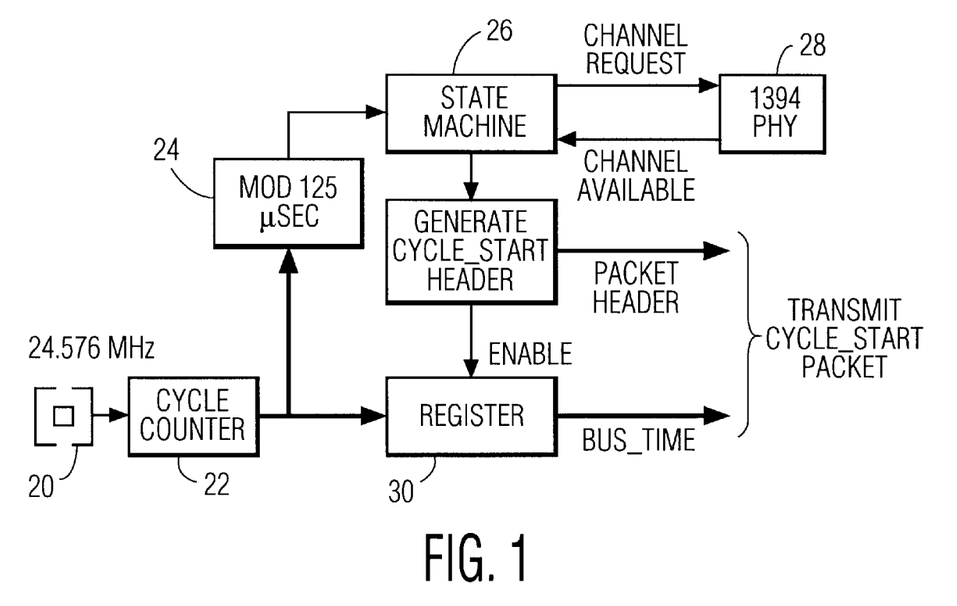
FIG. 1 is a block diagram of a cycle_start packet-generating portion of the cycle master of an IEEE 1394 serial bus.

With reference now to FIG. 1, a method for generating the cycle start_packet at the 1394 cycle master will now be described. More particularly, a crystal 20 that runs at the master clock rate of 24.576 MHz is input to a cycle counter 22. Frame synchronization is achieved by synchronizing the cycle counters within all 1394 nodes interconnected by the local 1394 serial bus. The output of the cycle counter 22 is passed through a modulo 125 ms block 24 that sends a trigger signal to a state machine 26 every 125 ms, in response thereto. The state machine 26 then sends a channel request signal to the 1394 Physical (PHY) layer 28 in response to the trigger signal sent by the modulo 125 ms block 24. As soon as the channel becomes available, the 1394 PHY layer 28 sends back a channel available signal to the state machine 26. In response to the channel available signal, the state machine 26 prepares the packet header for the cycle_start packet, and sends an enable signal to a register 30 to latch the contents of the cycle counter 22 at the proper instant to generate the current bus_time (timestamp value). Any delay in processing can be easily taken into account by properly delaying the enable signal to the register 30 by the amount of the processing delay.

At the receiver (i.e., each node that receives the cycle_start packet), the cycle counter in that node must be set to the appropriate bus_time received via the cycle_start packet. A method for accomplishing this task will now be described with reference to FIG. 2. More particularly, the PHY layer 33 of the receiver node receives the cycle_start packet and sends it to the link layer, which includes a decode cycle_start header block 35 for decoding the cycle_start packet header to ensure that it is indeed the cycle_start packet. Simultaneously, the bus_time value is extracted from the cycle_start packet and loaded into a register 37. A processing delay block 39 adds any processing delay (for the decoding operation and/or for the loading of the bus_time value into the register 37) to either the output of the register 37, or to a load signal output by the decode cycle_start header block 35. The load signal is applied to the load terminal of the cycle counter 41 of that receiver node to enable the loading of the sum of the contents of the register 37 and the processing delay into the cycle counter 41.

Figure 2:
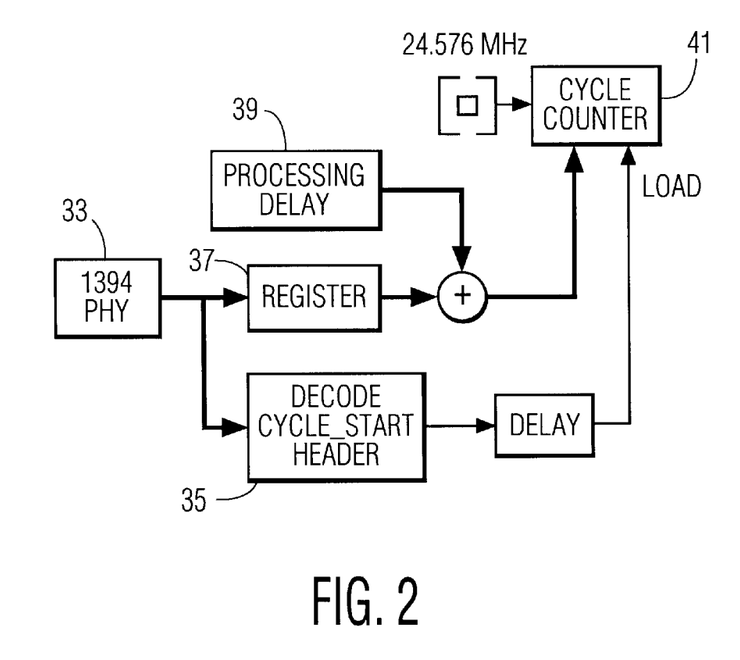
FIG. 2 is a block diagram of a bus_time resetting portion of a receiver node connected to an IEEE 1394 serial bus.

It should be recognized that it is extremely important to be cycle-accurate while resetting the cycle counter 41, which means that the bus_time transmitted by the cycle master must correspond to the exact time that the cycle_start packet is sent, and that the processing delay in each receiver node must be very precisely determined.

The resetting of the cycle counter 41 every 125 ms ensures that the clocks obtained from different crystals do not drift significantly with respect to each other. Most protocols have an interval during which the timestamp update must be sent. Otherwise, the timing jitter may be larger than what can be handled by a particular application, e.g., an MPEG decoder.

IEEE 802.11 has a similar protocol. More particularly, in accordance with the IEEE 802.11 standard, "beacons" are periodically broadcast, in a manner similar to the broadcast of the cycle_start packet in accordance with the IEEE 1394 standard. The beacon contains, among other fields, the timestamp value and the timestamp interval. The timestamp interval is flexible with the IEEE 802.11 standard, as contrasted to the fixed 125 ms cycle time with the IEEE 1394 standard. As with the IEEE 1394 standard, the beacon transmission can be delayed if the channel is not immediately available. As with the IEEE 1394 standard, the key requirement is that the timestamp value must correspond to the exact time of transmission of the beacon packet.

It should be recognized that both IEEE 1394 and IEEE 802.11 are not reservation-based protocols. In both cases, an arbitration phase is first initiated to determine access for a particular receiver node. Even the cycle_start and beacon packets must first arbitrate the use of the channel prior to transmission.

For a reservation-based TDMA protocol, there are many problems with the timestamp-based approach. The first problem is that the transmission of the timestamp value must also be reserved, and subsequently, other data must also be queued for transmission. In order to ensure efficient use of processor resources (which must be used for managing many other functions), this queuing is usually scheduled in advance. However, the timestamp value cannot be obtained until the exact time of transmission. Further, the queuing of the data packets behind the timestamp value cannot be done before the timestamp value is obtained. Of course, it is possible to switch the data stream between two separate queues with one holding the timestamp value and the other holding the data. However, this solution is quite complicated and requires precise synchronization.

Figure 3:
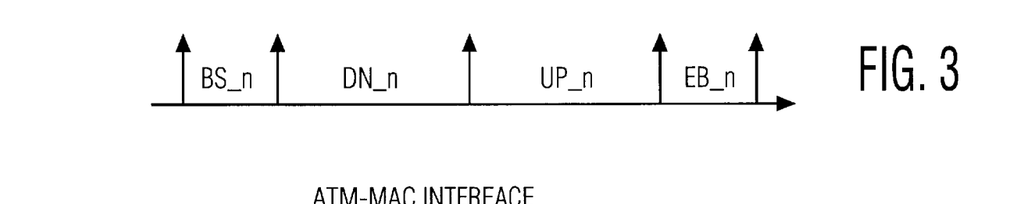
FIG. 3 is a diagram that depicts the structure of a periodic control-data-frame (CDF) used in a reservation-based MAC protocol for a wireless ATM network.

A more detailed understanding of this problem can be gained by considering the case of a wireless asynchronous transfer mode (ATM) network that uses a reservation-based medium-access control (MAC) protocol. The MAC protocol implementation depends on a periodic control-data-frame (CDF), as described by C. Y. Ngo and S. N. Hulyalkar in ADetailed MAC Sub-System Description for BS-Oriented WATM LAN@, WP3, D3.1, Aug. 15, 1996. Each CDF contains many phases, during which both control and data information is sent from both the base station (BS) and the wireless terminal (WT). FIG. 3 illustrates four phases for implementing such a generic structure, namely, BS_SIG; DN_DATA; UP_DATA; and, E_BURST. A brief description of each of these phases follows:

BS_SIG: During this phase, the BS sends control information for the downlink. The timestamp packet can be assumed to be sent during this phase. At the BS, the processor starts the transmission of packets from BS. At the WT, the WT starts the process of reception of packets from the BS.

DN_DATA: During this phase, the BS sends data packets for the WTs. At the BS, the processor is busy interpreting the packets sent by the WT during the UP_DATA phase. At the WT, the processor is busy storing the PHY FIFO for the next burst of transmission during the UP_DATA phase.

UP_DATA: During this phase, the WT sends data and signaling packets for the BS. Signaling is sent using superslots. At the BS, the processor is busy storing the PHY FIFO for the next burst of transmission during the BS_SIG and DN_DATA phases. At the WT, the processor is busy interpreting the packets sent by the BS during the BS_SIG and the DN_DATA phases.

E_BURST: During this phase, the WTs, which have not currently been allocated space for transmission during the UP_DATA phase, indicate whether they want to enter the WATM network. Both the WT and the BS processors are busy implementing the E_BURST phase.

The hardware design is based on the BS and each WT keeping the same timestamp values as a basis for computing the four phases of a CDF. All must maintain the same time periods in order to communicate and transfer packets effectively. All must synchronize their timestamps periodically, by copying the base station value, and all must take starting time directives from the BS.

The MAC processor is assumed to be interrupt-driven for both the WTs and the BS. The BS determines the timing for the entire system. Using the timestamp value as a reference, it determines the exact time when each of the phases operates. This timing information is sent during the BS_SIG_n phase. Since all phases are successive to each other, the WT and the BS set up a counter for the next phase based on the timing information, which then triggers an interrupt to the processor when the counter overflows. The processor must finish its functions during the respective phase within the time allotted and be prepared for the next phase.

For timestamp synchronization, the BS can be assumed to send a timestamp value during the BS_SIG phase. However, note that the BS is busy storing the PHY_FIFO with the packets intended for transmission during the BS_SIG and DN_DATA phases. However, the timestamp value must be determined during the BS_SIG phase and cannot be obtained during the UP_DATA phase. Consequently, the normal transmission stream must be stopped to allow for the timestamp value to be loaded from the timestamp register during the time of transmission. This solution is not desirable since it conflicts with the direct data path.

It should be appreciated that the problem described above is not due to the particular protocol considered, but is generally due to the reservation-based nature of the protocol, whereby decisions on what is transmitted at particular times are made in advance of those times.

One solution to this problem is to send only a timestamp packet during the BS_SIG phase. But for wireless ATM, which uses a 53-byte cell, this is a waste of resources, since a timestamp value may be only 4 bytes. More generally, the use of a fixed slot for transmission of only timestamp information results in a waste of network resources. In this connection, it should be recognized that this fixed slot is an intrinsic aspect of any reservation-based protocol, because without the "smallest" slotting, it is not possible to reserve any channel time. The problem arises due to the fact that the smallest time slot is still significantly greater than the time required to send only the timestamp value.

Based on the above and foregoing, it can be appreciated that there presently exists a need in the art for a method of timestamp synchronization in a reservation-based TDMA-protocol network that overcomes the above-described drawbacks and shortcomings of the presently available technology. The present invention fulfills this need in the art.

SUMMARY OF THE INVENTION

The present invention encompasses a method for synchronizing timestamps in a network (e.g., a wireless ATM network) that includes a control node and a plurality of other nodes that communicate with one another over a common channel mediated by a medium-access control subsystem (e.g., one that uses a reservation-based TDMA protocol). The method includes the steps of sending a first command from the control node, at a first time, then storing a starting timestamp value in a register within the control node and each of the other nodes, in response to the first command, and then sending a second command from the control node, at a second time later than the first time. Each of the other nodes computes the difference between the starting timestamp value and a current timestamp value, and then adds the computed difference to the current timestamp value. In an alternative embodiment, the control node sends a preset command and each of the other nodes presets their respective timestamp to a prescribed initial timestamp value, in response to the preset command. Each of the nodes periodically compares a current timestamp counter value with a prescribed reset value, and upon detecting a coincidence, sets a sync flag latch to indicate that a next timestamp value correction is to be made, in response to a next preset command.

The present invention also encompasses networks that implement the above-described methods.

BRIEF DESCRIPTION OF THE DRAWINGS

These and other features, objects, and advantages of the present invention will become more clearly understood from the following detailed description read in conjunction with the attached drawings, in which.

DETAILED DESCRIPTION OF THE INVENTION

Figure 4:
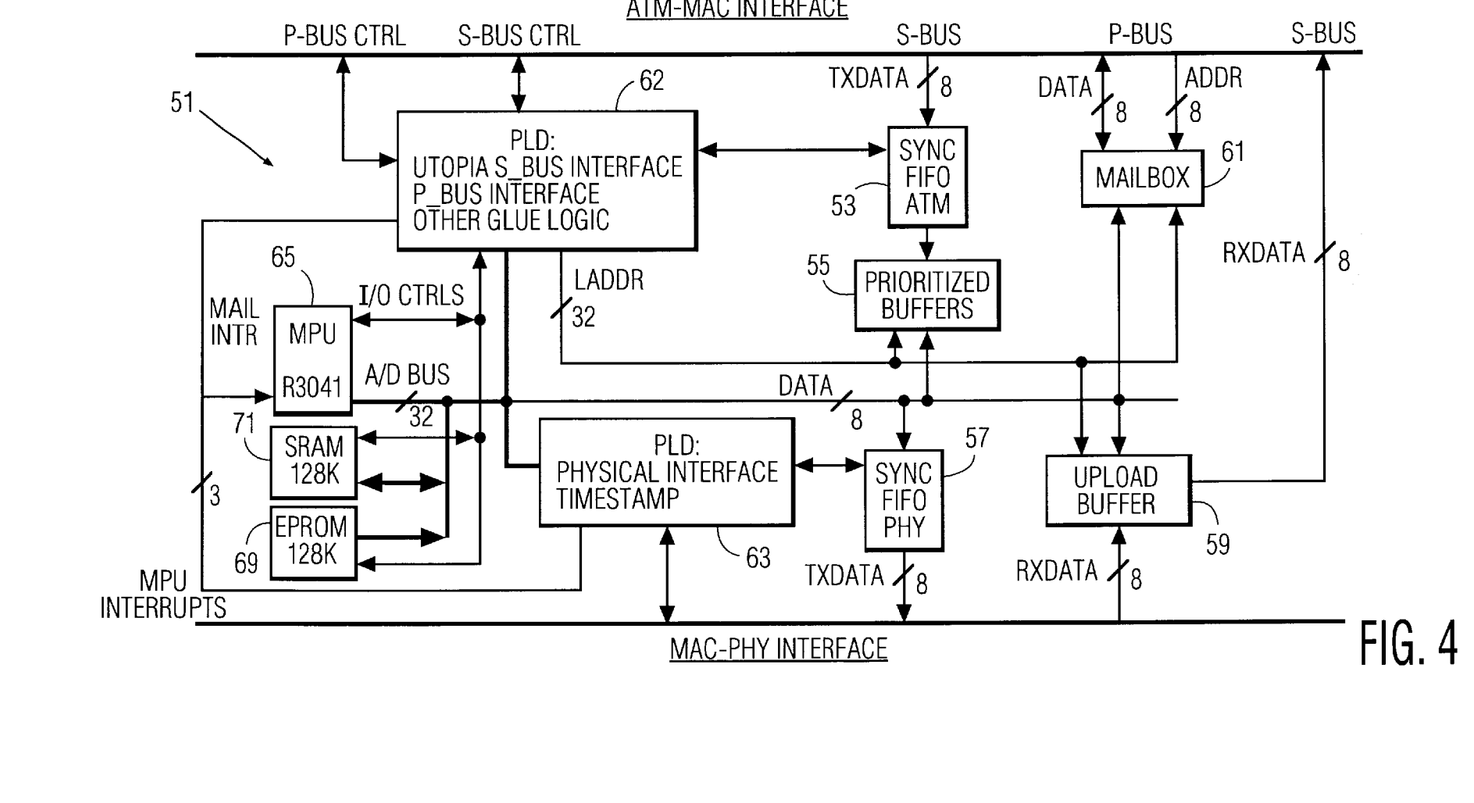
FIG. 4 is a block diagram of a MAC subsystem employed in an exemplary implementation of the present invention.

With reference now to FIG. 4, there can be seen the hardware block diagram of a medium-access control (MAC) subsystem 51 that is employed in an exemplary implementation of the present invention for frame synchronization in a wireless ATM network. In general, this hardware is highly programmable in order to accommodate variations and improvements in the MAC protocol. It provides a buffered data path between the ATM and Physical (PHY) layers to allow for MAC layer scheduling and management functions to be executed with a minimum amount of delay or packet loss. The download data path includes an input FIFO 53 to cushion the ATM data flow so that if a switch to a second pipe becomes necessary it can be done without packet loss, while still accommodating high data rates, such as the UTOPIA data rate; two SARAMs or prioritized buffers 55 in which scheduling takes place; and an output FIFO 57 to accommodate the PHY layer data rate. The upload data path includes an SARAM or upload buffer 59 that collects packets, allows RAM access to the MAC layer data, and continues sequential access to the ATM layer. A mailbox 61 (e.g., a dual-port RAM or DPRAM) is provided for mailbox functions between the MAC and ATM layers, e.g., for enabling the exchange of parameters and status information. A pair of programmable logic devices (PLDs) 62 and 63, are employed to control the interfaces, the data paths, and the timekeeping functions. A processor or microprocessor unit (MPU) 65 is coded (programmed) to perform all scheduling and management functions.

In an actual exemplary implementation, the two programmable devices 62, 63, are Altera FPLDs, designated AAltera_1@ and AAltera_2. and the MPU 65 is an IDT79R3041 MIPS RISC processor of the R3000 class. Altera_1 contains the address latches and chip select decoders that implement the memory map, command and status registers for processor interaction, and the signal set to interface with the ATM layer via UTOPIA. Altera_2 complements the processor with the timestamp counter and six comparators assigned as follows: four to the phases of the CDF, one to the beacon or timestamp recopy interval, and one more for association. Additionally, Altera_2 contains the physical layer interface signal set, and the command and status registers to interact with the processor.

For maximum flexibility and efficiency, a common hardware design is utilized for use in both the base station (BS) and each of the wireless terminals (WTs) in the wireless ATM (WATM) network. This is accomplished by providing two sets of operating code in a EEPROM 69 (or other suitable memory device), and using a switch selection or other suitable technique to call a selected one of the two sets of operating code into an SRAM 71 (or other suitable memory) upon power-up, in order to configure the hardware for use in either a BS or WT, as appropriate.

In the actual exemplary implementation, an AM29F010 128 K EEPROM device is utilized to hold boot code and the two sets of operating code (BS and WT), and an IDT71256 128K SRAM is employed for storage of dynamic parameters and general work space. The actual buffers where scheduling and MAC management functions are performed are IDT70825 dual port RAMs (DPRAMs), with random access via one port and sequential access via the other port. They permit stream data to be entered via the sequential port to be operated on by the MPU via the random access port, and then passed onto the next layer, again via the sequential port.

In overview, the basic inventive concept is to send the timestamp information in such a manner as to permit precise, deterministic scheduling (in advance) of the transmission of the timestamp value and to eliminate the necessity of sending only the timestamp value during a given (fixed) time slot.

In accordance with a first embodiment of the present invention, a "timestamp_preset" command is sent by the BS to all WTs in the network. Upon receiving the timestamp_preset command, all WTs preset their timestamp value to zero (or equal to the delay encountered through the physical layer). Although this eliminates a step (vis-à-vis the second embodiment), it results in the loss of the global time information.

In accordance with a second embodiment of the present invention, the timestamp information is sent in two steps. First, a "timestamp_get" command is sent by the BS, in response to which the current timestamp value is stored in a register at all terminals, including the BS. Then, at a later time, a "timestamp_load" command is sent, which sends the timestamp value stored in the BS register during the last timestamp_get command. Next, the receivers compute the difference between the timestamp value stored in the BS register and their stored timestamp value, and then add this difference to their current timestamp value.

The basic methodology of the first embodiment is as follows. The BS and all WTs each compare the current value of their timestamp counter against a fixed value (which is the same for all terminals) to determine when to set their sync flag latches, indicating that a correction will take place. For example, the value can be chosen to allow a 1 μs skew to develop between all timestamps in the network every 10 μs before a correction is commanded. All processors poll for these sync flags during the downlink phase of the CDF, and, if set, will detect this event concurrently. The timestamp value correction then takes place during the BS_SIG phase of the next CDF. The timestamp value correction is initiated by the BS sending a timestamp_preset command, which can simply be an appropriate header byte, to all of the WTs.

All of the WTs, and the BS, look for this header byte at their PHY layer interfaces in order to ensure that all terminals will act on the header byte as close in time as possible. The delay between them is the delay of the physical path only, which is constant. The timestamp value correction is preferably done entirely by hardware, without processor participation, so that the entire process is deterministic.

Figure 5:
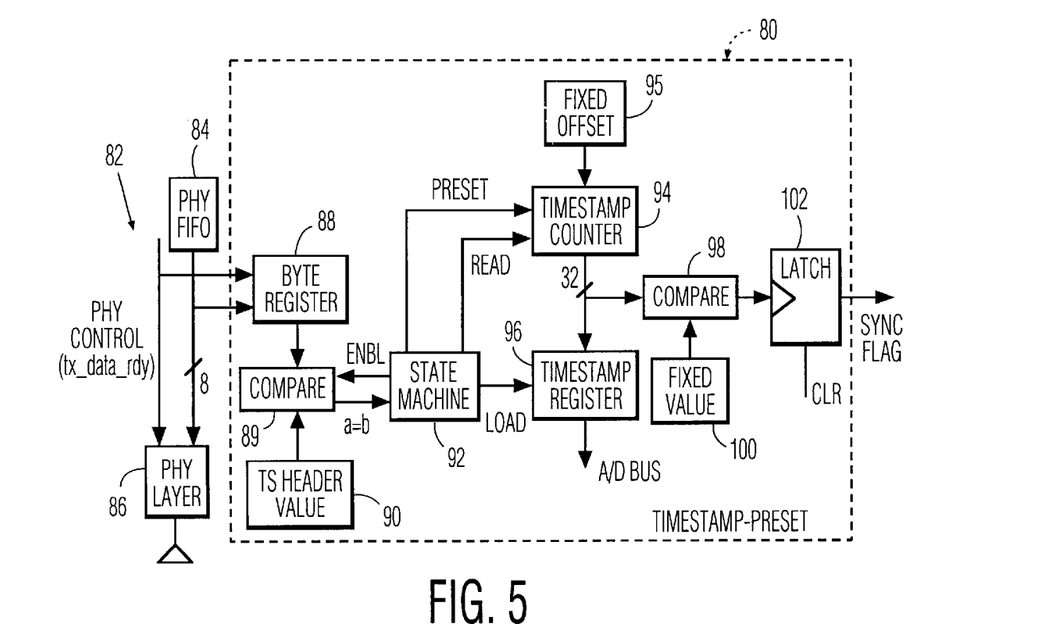
FIG. 5 is a block diagram of a timestamp-preset block of a base station implemented in accordance with a first embodiment of the present invention.

With particular reference now to FIG. 5, there can be seen a timestamp_preset block 80 and PHY layer interface 82 of the BS. The PHY layer interface 82 includes a PHY FIFO 84 that holds the timestamp_preset byte as the first byte to be transmitted when the designated BS_SIG phase begins. The timestamp_preset byte is concurrently transmitted to both the PHY layer 86 and a byte register 88 in the timestamp_preset block 80. A comparator 89 compares the timestamp_preset value captured by the byte register 88 with a fixed timestamp (TS) header value 90, and upon detecting a coincidence, initiates a state machine 92.

After being initiated, the state machine 92 reads the current timestamp value stored in the timestamp counter 94, and loads the read-out current timestamp value into a timestamp register 96. The state machine 92 then presets the timestamp counter 94 with a fixed offset (preset) value 95 that corresponds to the delay through the physical layer (for the BS, it subtracts this delay from zero). Next, the state machine 92 disables the byte register comparator 89 in order to avoid erroneous comparisons on subsequent data. A comparator 98 compares the current timestamp value output by the timestamp counter 94 with a fixed value 100 and sets the sync flag latch 102 upon detecting a coincidence, indicating that a correction will take place. As previously mentioned, this fixed value can be chosen to allow a 1 μs skew to develop between all timestamps in the network every 10 μs before a timestamp value correction is commanded.

Figure 6:
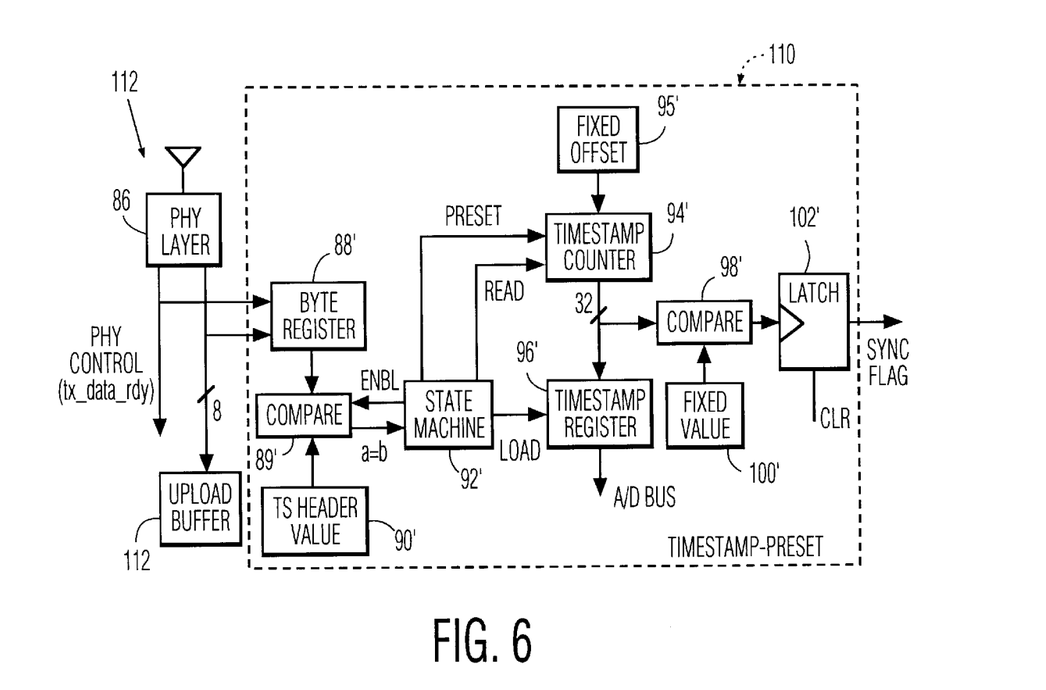
FIG. 6 is a block diagram of a timestamp preset block of a wireless terminal implemented in accordance with the first embodiment of the present invention; and, FIG. 7 is a block diagram of a timestamp load block of a base station and wireless terminal in accordance with a second embodiment of the present invention.

With reference now to FIG. 6, there can be seen a timestamp_preset block 110 and PHY layer interface 112 of a WT. It will be readily seen that the timestamp_preset block 110 of the WT is identical to the timestamp_preset block 80 of the BS, and, as such, like elements in the two blocks are indicated by the same numerals, except that the numerals designating the elements in the timestamp_preset block 110 are primed. It will also be appreciated that the hardware of each WT will be identical. At the WTs, the header byte is received as the first byte of a packet. It is concurrently stored in the byte register 88' and an upload buffer 112. A comparator 89' compares the timestamp_preset value captured by the byte register 88' with a fixed timestamp (TS) header value 90', and upon detecting a coincidence, initiates a state machine 92'.

After being initiated, the state machine 92' reads the current timestamp value stored in the timestamp counter 94', and loads the read-out current timestamp value into a timestamp register 96'. The state machine 92' then presets the timestamp counter 94' with a fixed offset (preset) value 95' that corresponds to the delay through the physical layer. Next, the state machine 92' disables the byte register comparator 89' in order to avoid erroneous comparisons on subsequent data. A comparator 98' compares the current timestamp value output by the timestamp counter 94' with the fixed value 100' and sets the sync flag latch 102' upon detecting a coincidence, indicating that a correction will take place.

Since the timestamp value correction process is performed by identical hardware at both ends, close synchronism is achieved. The amount of delay between the BS and each WT is merely the propagation delay of the signal.

Timestamp values stored in the holding registers 96 and 96' may be used as needed to compute corrections for other protocol layers that the MAC layer may interface within the same transceiver. To facilitate this operation, the BS must send its TS register value in a separate message (over an A/D bus), typically in the next BS_SIG phase. Each WT then determines the difference between the BS TS register value and its TS register value and thus determines the amount of time offset from the BS. Other protocol layers can use this offset to correct their timestamp value if required. Thus, in this case, the MAC layer loses the global time reference, but is still able to achieve frame synchronization.

Figure 7:
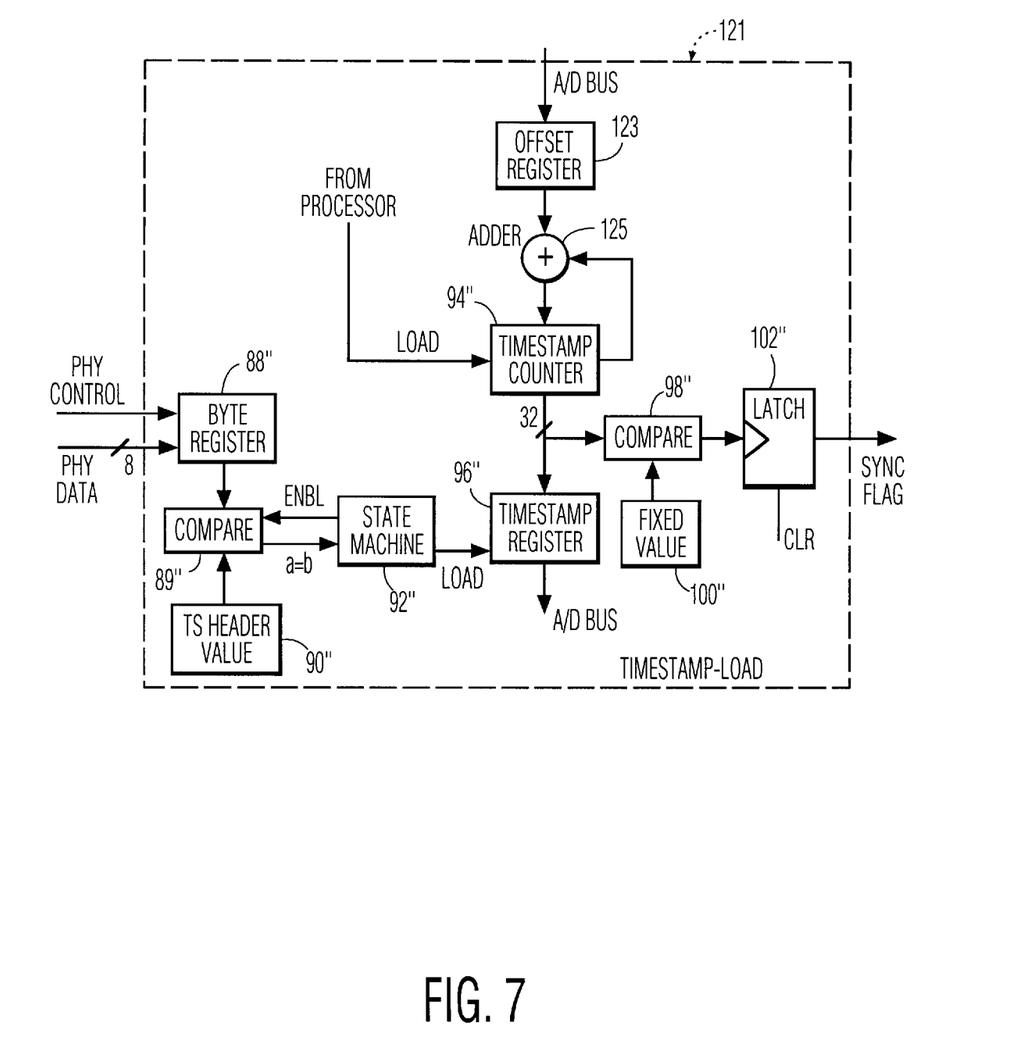

With reference now to FIG. 7, there can be seen a block diagram of a timestamp_load block 121 designed in accordance with the second embodiment of the present invention, and which is common to both the BS and the WTs. As will be readily seen, the timestamp_load block 121 constitutes a simple modification of the timestamp_preset blocks 80 and 110 depicted in FIGS. 5 and 6, respectively and described hereinabove. As such, like elements are indicated by the same numerals, except that the numerals designating the elements in the timestamp_load block 121 are double primed.

As will become apparent, with this embodiment, a global time reference can be maintained in the MAC layer. With this embodiment, the timestamp information is sent in two steps. First, a "timestamp_get" command is sent, which is similar to the timestamp_preset command discussed hereinabove. This command has no parameters and can be coded in one byte. The BS and all WTs load their respective timestamp (TS) register 96" when this timestamp_get command is detected. Second, the BS issues a "timestamp_load" command a parameter of which is the timestamp value held in its TS register 96" when the last timestamp_get command was sent. Each WT then calculates the difference between the received BS timestamp value and the timestamp value held in its TS register 96", and then stores this difference (offset) value in an Offset Register 123. Next, the processor at the WT sends a ALOAD@ command, which causes an adder 125 to add the offset value from the Offset Register 123 to the current value of the timestamp counter 94", and to then reload the sum into the timestamp counter 94". It should be appreciated that this operation is not time-critical.

This embodiment introduces the additional complexity of the adder 125, which can be as large as 32 bits. However, since this operation is not time-critical, it is not necessary to implement a full 32-bit adder. For example, it is possible to use a 4-bit adder by performing the addition over many clock cycles, with the timestamp counter 94" being disabled during this time period. This loss in clock cycles should be accommodated within the Offset Register 123 by the processor software.

It is possible that multiple timestamp_get commands can be sent before a timestamp_load command is sent. In this case, the BS can copy the value of the TS register 96" after every timestamp_get command and then send the timestamp_load command with the parameter equal to the sum of all such values. The WTs can compute the sum of all the values in the TS register 96" after every timestamp_get command and then compute the difference between the parameter value received via the timestamp_load command and this computed sum, and then set the Offset Register 123 with this difference value.

By breaking the transmission of the timestamp values into two steps, data and timestamp packets can be scheduled for transmission before the actual time of transmission, thus allowing significant flexibility in the design of software for the MAC protocol.

Although the present invention has been described in detail hereinabove, it should be clearly understood that many variations and/or modifications of the basic inventive concepts taught herein which may appear to those skilled in the pertinent art will still fall within the spirit and scope of the present invention as defined in the appended claims.

For example, it should be appreciated that it is not necessary that both the timestamp_get and timestamp_load commands be initiated by the same terminal (node), such as the BS. Rather, as is generally known in the art, it is possible to utilize a network in which any node in the network can be dynamically re-assigned at any time to serve as the network control node or BS. Such networks thus provide the capability of distributed synchronization. Thus, the node which is presently assigned as the control node can be employed to generate the relevant command, e.g., the timestamp_get or timestamp_load command.

What is claimed is:

1. A method for synchronizing timestamps in a network that includes a control node and a plurality of other nodes that communicate with one another over a common channel mediated by a medium-access control subsystem, the method including the steps of:
   sending a first command from the control node, at a first time;
   storing a starting timestamp value in a register within the control node and each of the other nodes, in response to the first command;
   sending a second command from the control node, at a second time later than the first time; and,
   each of the other nodes computing a difference between the starting timestamp value and a second timestamp value from said second command, and then adding the computed difference to a current timestamp value.

2. The method as set forth in claim 1, wherein:
   the network is a wireless network;
   the control node is a base station; and,
   each of the other nodes is a wireless terminal.

3. The method as set forth in claim 1, wherein the medium-access control subsystem uses a reservation-based TDMA protocol.

4. The method as set forth in claim 2, wherein the network is a wireless ATM network.

5. The method as set forth in claim 1, wherein the first command comprises a timestamp_get command and the second command comprises a timestamp_load command.

6. The method as set forth in claim 1, wherein any selected one of the nodes in the network can be assigned to serve as the control node at different times.

7. A method for synchronizing timestamps in a network that includes a control node and a plurality of other nodes that communicate with one another over a common channel mediated by a medium-access control subsystem, the method including the steps of:
   sending a preset command from the control node;
   each of the other nodes presetting a value of their respective timestamp to a prescribed initial timestamp value, in response to the preset command; and,
   each of the other nodes periodically comparing a current timestamp counter value that is based on said prescribed initial timestamp value with a prescribed reset value in each of said nodes, and upon detecting coincidence between their respective current timestamp counter value and the prescribed reset value, setting a sync flag latch to indicate that a next timestamp value correction is to be made, in response to a next preset command.

8. The method as set forth in claim 7, wherein:
   the network is a wireless network;
   the control node is a base station; and,
   each of the other nodes is a wireless terminal.

9. The method as set forth in claim 8, wherein the medium-access control subsystem uses a reservation-based TDMA protocol.

10. The method as set forth in claim 9, wherein the network is a wireless ATM network.

11. The method as set forth in claim 7, wherein any selected one of the nodes in the network can be assigned to serve as the control node at different times.

12. A network, including:
    a control node;
    a plurality of other nodes;
    a medium-access control subsytem that mediates access to a communications channel used in common by the control node and the plurality of other nodes; and,
    wherein the control node and the plurality of other nodes each include:
    a comparator register that stores a preset command byte of a control packet transmitted by the control node at designated transmission times, and a prescribed header value and, upon detecting a coincidence between said preset command byte and prescribed header value, outputs a trigger signal;
    a timestamp counter;
    a timestamp register;
    a sync flag latch;
    a state machine that, in response to the trigger signal, reads a timestamp value stored in the timestamp counter, loads the read-out timestamp value into the timestamp register, and presets the timestamp counter with a stored prescribed preset value; and,
    a second comparator that compares the current timestamp value stored by the timestamp counter with the prescribed reset value and, upon detecting a coincidence, sets the sync flag latch to indicate that a next timestamp value correction is to be made, in response to a next preset command byte.

13. The network as set forth in claim 12, wherein the prescribed preset value for the control node is zero.

14. The network as set forth in claim 12, wherein the prescribed preset value for each of the other nodes corresponds to a delay through a physical layer.

15. The network as set forth in claim 13, wherein the prescribed preset value for each of the other nodes corresponds to a delay through a physical layer.

16. The network as set forth in claim 12, wherein:

the network is a wireless network;

the control node is a base station; and, each of the other nodes is a wireless terminal.

17. The network as set forth in claim 16, wherein the medium-access control subsystem uses a reservation-based TDMA protocol.

18. The network as set forth in claim 17, wherein the network is a wireless ATM network.

19. The network as set forth in claim 12, wherein the designated transmission times correspond to BS_SIG phases of control-data-frames.

20. The network as set forth in claim 12, wherein any selected one of the nodes in the network can be assigned to serve as the control node at different times.

21. A network, including:

a control node;

a plurality of other nodes;

a medium-access control subsytem that mediates access to a communications channel used in common by the control node and the plurality of other nodes; and, wherein the control node and the plurality of other nodes each include:

- a comparator register that stores a command byte of a control packet transmitted by the control node at first times;
- a first comparator that compares the value of the command byte with a prescribed header value and, upon detecting a coincidence between said preset command byte and prescribed header value, outputs a trigger signal;
- a timestamp counter;
- a timestamp register;
- a sync flag latch;
- an offset register;
- a state machine that, in response to the trigger signal, reads a timestamp value stored in the timestamp counter, and loads the read-out timestamp value into the timestamp register; and,
- processor circuitry that computes the difference between a last timestamp value transmitted by the control node at second times later than the first times, and a current timestamp value stored in the timestamp register, and then stores this difference as an offset value in the offset register;
- an adder that adds the offset value stored in the offset register to a current value of the timestamp counter and then reloads the sum into the timestamp counter; and,
- a second comparator that compares the current timestamp value stored by the timestamp counter with a stored prescribed reset value and, upon detecting a coincidence, sets the sync flag latch to indicate that a next timestamp value correction is to be made, in response to a next first command byte.

22. The network as set forth in claim 21, wherein the last timestamp value transmitted by the control node corresponds to the timestamp value stored in the timestamp register of the control node at the time that the previous command byte was transmitted.

23. The network as set forth in claim 22, wherein:

the network is a wireless network;

the control node is a base station; and, each of the other nodes is a wireless terminal.

24. The network as set forth in claim 22, wherein the medium-access control subsystem uses a reservation-based TDMA protocol.

25. The network as set forth in claim 24, wherein the network is a wireless ATM network.

26. The network as set forth in claim 21, wherein any selected one of the nodes in the network can be assigned to serve as the control node at different times.

* * * * *